United States Patent
Bales et al.

(10) Patent No.: US 9,981,656 B2
(45) Date of Patent: May 29, 2018

(54) VEHICLE PARKING ASSIST SYSTEM

(71) Applicant: Ford Global Technologies, LLC, Dearborn, MI (US)

(72) Inventors: John Bales, Canton, MI (US); Michael Hafner, Ann Arbor, MI (US); Kevin Smith, Royal Oak, MI (US); Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 14/881,919

(22) Filed: Oct. 13, 2015

(65) Prior Publication Data
US 2017/0101089 A1    Apr. 13, 2017

(51) Int. Cl.
| | |
|---|---|
| *B60W 10/18* | (2012.01) |
| *B60W 10/184* | (2012.01) |
| *B60W 30/06* | (2006.01) |
| *B60W 30/18* | (2012.01) |
| *B60T 7/22* | (2006.01) |
| *B60W 10/06* | (2006.01) |
| *B60W 10/04* | (2006.01) |

(52) U.S. Cl.
CPC .............. *B60W 30/06* (2013.01); *B60T 7/22* (2013.01); *B60W 10/06* (2013.01); *B60W 10/184* (2013.01); *B60W 30/18036* (2013.01); *B60W 30/18136* (2013.01); *B60W 10/04* (2013.01); *B60W 10/18* (2013.01); *B60W 2550/10* (2013.01); *B60W 2720/10* (2013.01)

(58) Field of Classification Search
CPC ........... B60W 30/06; B60W 30/18036; B60W 10/04; B60W 2550/10; B60W 10/18

USPC ........................................................ 701/96
See application file for complete search history.

(56) References Cited

U.S. PATENT DOCUMENTS

| | | | |
|---|---|---|---|
| 5,919,241 | A | 7/1999 | Bolourchi et al. |
| 6,122,579 | A | 9/2000 | Collier-Hallman et al. |
| 6,370,459 | B1 | 4/2002 | Phillips |
| 6,424,895 | B1 | 7/2002 | Shimizu et al. |
| 6,539,288 | B2 | 3/2003 | Ishida et al. |
| 6,631,781 | B2 | 10/2003 | Williams et al. |

(Continued)

FOREIGN PATENT DOCUMENTS

| | | |
|---|---|---|
| DE | 102005043466 A1 | 3/2007 |
| EP | 0842841 B1 | 5/2002 |

(Continued)

OTHER PUBLICATIONS

SH.Azadi et al., Automatic Parking of an Articulated Vehicle Using ANFIS, Global Journal of Science, Engineering and Technology, GJSET Publishing, 2013, Issue 14, 2013, pp. 93-104.

(Continued)

*Primary Examiner* — Harry Y Oh
(74) *Attorney, Agent, or Firm* — Frank MacKenzie; Price Heneveld LLP

(57) ABSTRACT

A parking assist system for a vehicle is provided that includes a proximity sensor configured to sense a distance to an obstacle, a parking controller configured to output a distance to target signal and a scheduler configured to process the distance to target signal and output a distance error signal to a control module configured to longitudinally control the vehicle. The scheduler is configured to process both a static and a dynamic distance to target signal.

15 Claims, 5 Drawing Sheets

(56) References Cited

U.S. PATENT DOCUMENTS

| | | |
|---|---|---|
| 7,039,504 B2 | 5/2006 | Tanaka et al. |
| 7,546,191 B2 | 6/2009 | Lin et al. |
| 7,706,944 B2 | 4/2010 | Tanaka et al. |
| 7,777,615 B2 | 8/2010 | Okuda et al. |
| 7,904,222 B2 | 3/2011 | Lee et al. |
| 8,020,657 B2 | 9/2011 | Allard et al. |
| 8,139,109 B2 | 3/2012 | Schmiedel et al. |
| 8,169,341 B2 | 5/2012 | Toledo et al. |
| 8,319,614 B2 * | 11/2012 | Takano ............... B60R 1/00 340/3.1 |
| 8,374,749 B2 | 2/2013 | Tanaka |
| 8,406,956 B2 | 3/2013 | Wey et al. |
| 8,427,288 B2 | 4/2013 | Schofield et al. |
| 8,464,829 B2 | 6/2013 | Von Tardy-Tuch et al. |
| 8,498,770 B2 | 7/2013 | Takano |
| 8,521,364 B2 | 8/2013 | Hueger et al. |
| 8,571,758 B2 | 10/2013 | Klier et al. |
| 8,645,015 B2 | 2/2014 | Oetiker et al. |
| 8,755,984 B2 | 6/2014 | Rupp et al. |
| 8,798,860 B2 | 8/2014 | Dechamp |
| 8,823,796 B2 | 9/2014 | Shen et al. |
| 8,825,221 B2 | 9/2014 | Hueger et al. |
| 8,888,120 B2 | 11/2014 | Trevino |
| 8,909,426 B2 | 12/2014 | Rhode et al. |
| 8,948,990 B2 | 2/2015 | Kobayashi et al. |
| 9,043,083 B2 | 5/2015 | Kadowaki et al. |
| 9,102,271 B2 | 8/2015 | Trombley et al. |
| 9,132,856 B2 | 9/2015 | Shepard |
| 9,174,672 B2 | 11/2015 | Zeng et al. |
| 9,208,686 B2 | 12/2015 | Takamatsu |
| 9,229,453 B1 * | 1/2016 | Lee ............... G05D 1/0214 |
| 9,238,483 B2 | 1/2016 | Hafner et al. |
| 9,248,858 B2 | 2/2016 | Lavoie et al. |
| 9,400,897 B2 | 7/2016 | Bruening et al. |
| 9,429,943 B2 | 8/2016 | Wilson et al. |
| 9,464,913 B2 | 10/2016 | Brown et al. |
| 9,520,063 B2 | 12/2016 | Noh |
| 9,840,278 B2 * | 12/2017 | Lavoie ............... B62D 13/06 |
| 2005/0206225 A1 | 9/2005 | Offerle et al. |
| 2006/0190147 A1 | 8/2006 | Lee et al. |
| 2006/0244579 A1 | 11/2006 | Raab |
| 2007/0057816 A1 | 3/2007 | Sakakibara et al. |
| 2009/0222202 A1 * | 9/2009 | Kato ............... G01C 21/3658 701/414 |
| 2012/0224059 A1 | 9/2012 | Takamatsu |
| 2012/0271522 A1 | 10/2012 | Rupp et al. |
| 2012/0283909 A1 | 11/2012 | Dix |
| 2012/0316732 A1 | 12/2012 | Auer |
| 2013/0006472 A1 | 1/2013 | McClain et al. |
| 2013/0120161 A1 | 5/2013 | Wakabayashi et al. |
| 2013/0229524 A1 | 9/2013 | Vovkushevsky et al. |
| 2013/0231824 A1 * | 9/2013 | Wilson ............... G05D 1/0246 701/26 |
| 2013/0235700 A1 * | 9/2013 | Koudar ............... G01S 15/08 367/99 |
| 2013/0238193 A1 | 9/2013 | Bolourchi et al. |
| 2014/0121883 A1 | 5/2014 | Shen et al. |
| 2014/0188344 A1 | 7/2014 | Lavoie |
| 2014/0244095 A1 * | 8/2014 | Choi ............... B62D 15/0285 701/25 |
| 2014/0267727 A1 | 9/2014 | Alaniz |
| 2015/0025732 A1 | 1/2015 | Min et al. |
| 2015/0077557 A1 | 3/2015 | Han et al. |
| 2015/0158524 A1 | 6/2015 | Lee et al. |
| 2015/0187217 A1 * | 7/2015 | Yao ............... B60T 7/22 701/301 |
| 2015/0191200 A1 | 7/2015 | Tsubaki et al. |
| 2015/0217692 A1 | 8/2015 | Yanagawa |
| 2015/0232092 A1 | 8/2015 | Fairgrieve et al. |
| 2015/0251602 A1 | 9/2015 | Baur et al. |
| 2015/0274202 A1 | 10/2015 | Tsunoda et al. |
| 2015/0369613 A1 | 12/2015 | Stadler |
| 2016/0016606 A1 * | 1/2016 | Tsubaki ............... B62D 5/0472 701/41 |
| 2016/0207526 A1 | 7/2016 | Franz et al. |
| 2016/0229452 A1 | 8/2016 | Lavoie et al. |
| 2016/0272244 A1 * | 9/2016 | Imai ............... G08G 1/166 |
| 2016/0288786 A1 * | 10/2016 | Lavoie ............... B60T 8/1708 |
| 2016/0304088 A1 | 10/2016 | Barth |
| 2016/0304122 A1 | 10/2016 | Herzog et al. |
| 2016/0320477 A1 | 11/2016 | Heimberger |

FOREIGN PATENT DOCUMENTS

| | | |
|---|---|---|
| EP | 1006042 B1 | 4/2006 |
| EP | 2213546 A1 | 8/2010 |
| GB | 2496298 A | 5/2013 |
| JP | 649063 A | 1/1989 |
| JP | 2002337717 A | 11/2002 |
| JP | 2003261053 A | 9/2003 |
| JP | 2009113512 A | 5/2009 |
| KR | 20110114897 A | 4/2010 |
| KR | 1020140004411 A | 1/2014 |
| KR | 1020150038776 A | 4/2015 |

OTHER PUBLICATIONS

Cuesta et al., Intelligent System for Parallel Parking of Cars and Tractor-Trailers, Intelligent Mobile Robot Navigation, Star 16, Springer-Verlag Berlin Heidelberg 2006, pp. 159-188.

* cited by examiner

US 9,981,656 B2

VEHICLE PARKING ASSIST SYSTEM

FIELD OF THE INVENTION

The present disclosure generally relates to systems for controllably assisting with the parking of a vehicle. In particular, various systems are disclosed which arbitrate between parking location distances.

BACKGROUND OF THE INVENTION

Automatic parking an automotive vehicle in a target parking location may be challenging due to unexpected disturbances present which can hinder the longitudinal control of the vehicle. These disturbances may be exacerbated while towing a trailer. The unexpected disturbances along the parking path of the vehicle may lead to undershoot or overshoot of the desired final location of the vehicle.

SUMMARY OF THE INVENTION

According to one aspect of the present disclosure, a parking assist system for a vehicle is provided that includes a proximity sensor configured to sense a distance to an obstacle, a parking controller configured to output a distance to target signal and a scheduler configured to process the distance to target signal and output a distance error signal to a control module configured to longitudinally control the vehicle. The scheduler is configured to process both a static and a dynamic distance to target signal.

According to another aspect of the present disclosure, a method for assisting in parking a vehicle is provided that includes the steps of initiating a parking sequence to a target location along a target path, transmitting a distance to target signal from a parking controller to a scheduler, generating a distance error signal using the scheduler and transmitting the distance error signal to a control module. The scheduler is configured to accept both a static and a dynamic distance to target signal.

According to another aspect of the present disclosure, a method for assisting in parking a vehicle is provided that includes the steps of initiating a parking sequence to a target location, receiving a dynamic distance to target signal at a scheduler, sensing the presence of an obstacle with a proximity sensor and a distance between the vehicle and the obstacle, determining a distance traveled by the vehicle since sensing of the obstacle, and generating a distance error signal based on the closer of the target location and obstacle.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
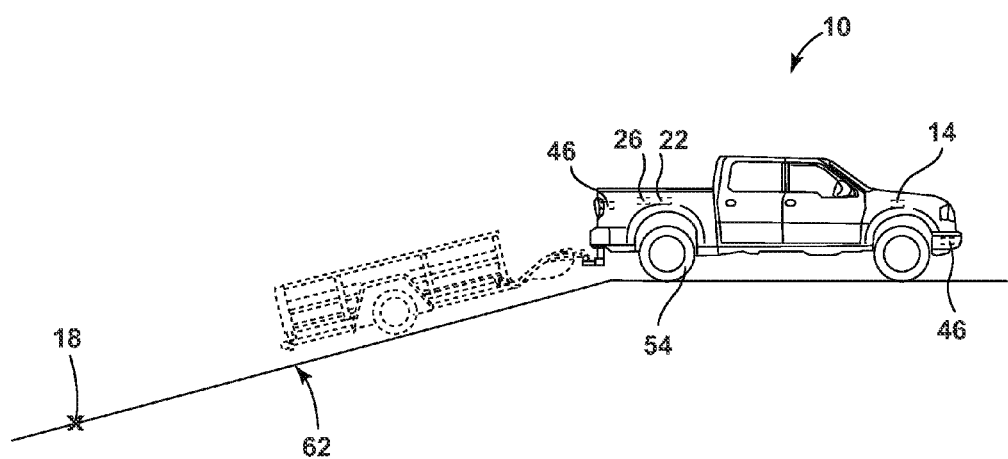
FIG. 1 is a side perspective view of a vehicle at one location in a parking maneuver, according to one embodiment.

Referring to FIGS. 1-4B, reference numeral 10 generally designates an automotive wheeled vehicle that includes a parking assist system 14 for assisting in maneuvering the vehicle 10 along a target path $T_p$ and parking the vehicle 10 at a target location 18. The parking assist system 14 includes a brake system 22 having at least one wheel count encoder 26, a parking aid controller 30, a vehicle controller area network (CAN) 34, a scheduler 38, and a control module 42. The vehicle CAN 34 ay also be generally known as a vehicle communication bus. It should be appreciated that other wired or wireless communications may be employed. Positioned at a rear of the vehicle 10 are one or more proximity sensors 46 which may be used for sensing objects in front of and behind the vehicle 10. The proximity sensors 46 may be ultrasonic sensors, radar sensors, magnetic and/or capacitive sensors and/or visual sensors, such as video cameras or laser sensors. The brake system 22 may be an anti-lock brake system having one or more anti-lock brake modules positioned proximate the wheels 54 of the vehicle 10. The wheel count encoder 26 may be used to count the number of revolutions a particular wheel 54 undergoes and outputs a signal to the vehicle CAN 34. The parking aid controller 30 may be used to assist in the automatic parking of the vehicle 10 at the target location 18, as described in greater detail below.

Referring to FIG. 1, the vehicle 10 is shown in an exemplary parking scenario in which a driver of the vehicle 10 is attempting to park the vehicle 10 at the target location 18 positioned on a vertically inclined surface or hill 62 while backing up the vehicle 10. Parking of the vehicle 10 may be carried out using the parking assist system 14, which is generally configured to assist a driver of the vehicle 10 in various ways in parking the vehicle 10. It will be understood that although depicted in a backward parking maneuver, the parking assist system 14 may also be used in forward parking scenarios of the vehicle 10. Additionally, in various embodiments, automatic parking of the vehicle 10 with the parking assist system 14 may be carried out while the vehicle 10 is towing or pushing an object (e.g., a trailer, camper, etc.) in forward or reverse directions without departing from the scope of the disclosure. In one example, the parking assist system 14 can include both actions carried out by the driver of the vehicle 10 as well as by the system 14. In particular, the driver may initiate the parking assist system 14 after driving the vehicle 10 along a path to a desired location at which the parking maneuver is to begin. Once the parking system 14 is activated, the driver may select the target location 18 where the vehicle 10 will be parked, for example, via a screen, display, or control surface (e.g., buttons or knobs) to indicate to the parking assist system 14 where the driver wishes the vehicle 10 to be parked. The parking assist system 14 may cause the vehicle 10 to steer automatically, such as by control of an electronic power assisted steering ("EPAS") system, to implement turning maneuvers determined to be appropriate for parking the vehicle 10 and/or trailer.

Figure 2:
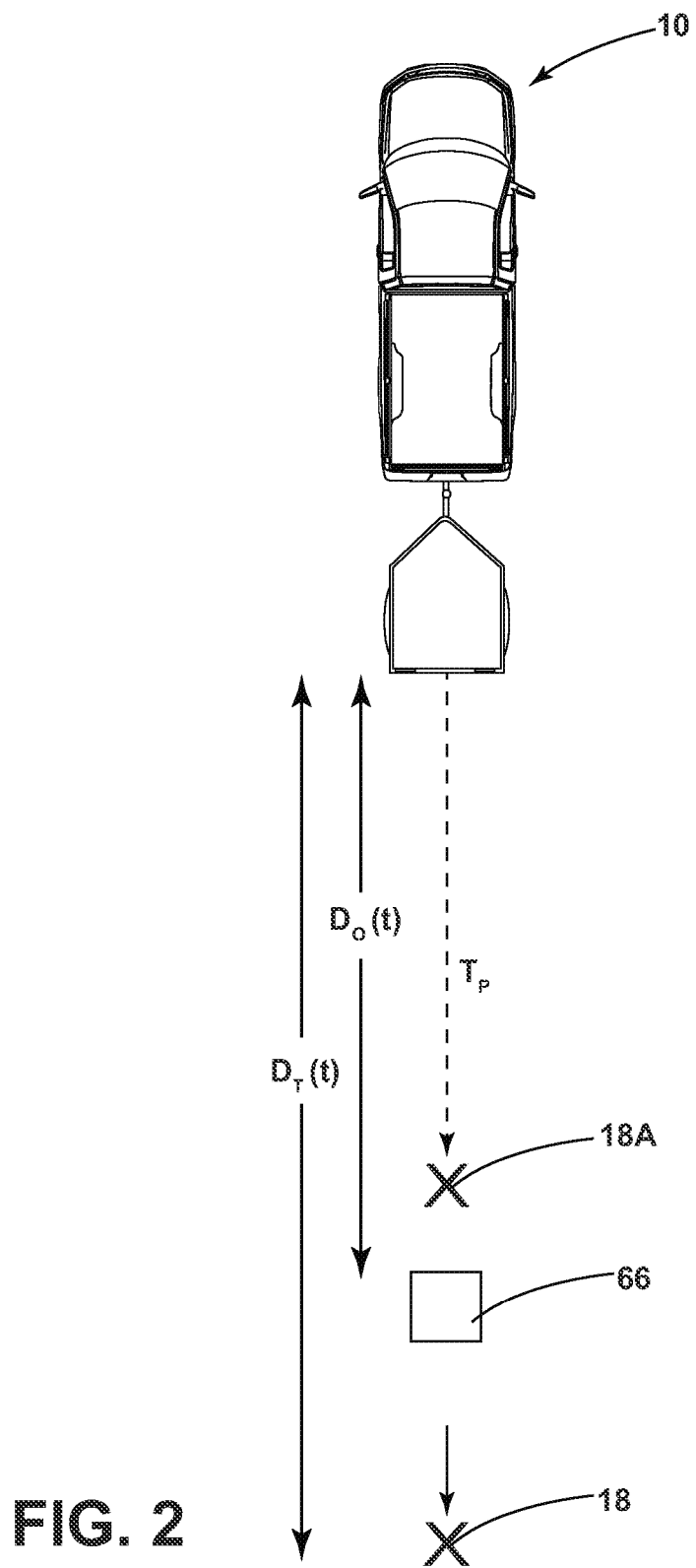
FIG. 2 is a top perspective view of a vehicle at another location in a parking maneuver, according to one embodiment.

Referring now to FIGS. 1 and 2, in conventional systems, longitudinal motion of the vehicle 10 may be the responsibility of the driver, but this can be a taxing experience and the driver may attempt to accelerate the vehicle 10 faster than allowably safe speeds. Additionally, the driver may encounter situations where atypical forces are acting on the vehicle 10 during parking For example, situations such as that depicted in FIG. 1, where the target location 18 for parking is positioned on a hill 62, may be particularly difficult for the driver due to the requirement that additional throttle or brake must be applied relative to level ground parking maneuvers. Further, the appearance of an obstacle 66 (e.g., a person, vehicle, debris, animal, curb and/or vegetation) proximate (e.g., on, to the side of and/or beyond) the target path $T_P$ and/or target location 18 may present issues related to the arbitration of where the vehicle 10 should be stopped during the parking maneuver. When the obstacle 66 is detected, the system 14 may park the vehicle 10 at an obstacle location 18A, located proximate the obstacle 66, to prevent a collision between the vehicle 10 and the obstacle 66. Accordingly, systems such as the parking assist system 14 can include the scheduler 38 (FIG. 3) and the control module 42 (FIG. 3) to control the longitudinal motion of the vehicle 10 by automatically applying the brakes via an input to the brake system 22. In various embodiments, the scheduler 38 is configured to operate in both a static target mode and a dynamic target mode depending on the type of parking controller 30 provided. In the static target mode, the target distance signal $D_T(t)$ is calculated by the scheduler 38 based on a static target signal from the parking controller 30 which stays constant as the vehicle 10 is moved through the parking maneuver. In some embodiments, the static target signal from the parking controller 30 may be a distance of the target path $T_P$ from the start of the parking maneuver. In a dynamic target mode, the target distance signal $D_T(t)$ is updated based on the position of the vehicle 10 and provided to the scheduler 38 from the parking controller 30. Embodiments of the scheduler 38 that may operate on both static and dynamic target signals may be advantageous in that it offers designers of the system 14 flexibility in choice of the parking controller 30, as well as overall system 14 design.

Figure 3:
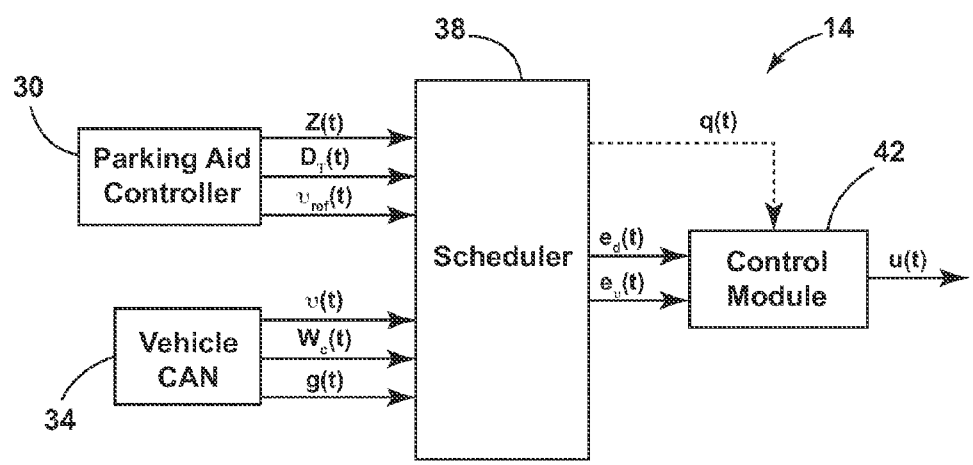
FIG. 3 is a block diagram illustrating a parking assist system, according to one embodiment.

Referring now to FIG. 3, the parking aid controller 30, vehicle CAN 34, scheduler 38 and the control module 42 may all include control circuitry such as a microprocessor and a memory unit, according to one embodiment. The memory of the parking aid controller 30, the vehicle CAN 34, the scheduler 38 and the control module 42 may include random access memory (RAM), read-only memory (ROM), and electrically erasable programmable read-only memory (EEPROM). The memory may contain one or more routines specific to the component to which it is associated with or attached, which may also be integrated in various memory units in various locations and components of the vehicle 10. The microprocessor of the parking aid controller 30, vehicle CAN 34, scheduler 38 and the control module 42 operate their respective routines stored in respective memory in order to operate. It should be appreciated that the parking aid controller 30, vehicle CAN 34, scheduler 38 and control module 42 may be implemented with dedicated or shared controllers.

Referring again to FIG. 3, some of the components of the parking system 14 are shown schematically. Specifically, the embodiment shown depicts the parking aid controller 30 and the vehicle CAN 34 providing a plurality of data inputs to the scheduler 38, which then provides data inputs to the control module 42. The parking aid controller 30 and the vehicle CAN 34 are shown in electrical connection or data communication with the scheduler 38, which in turn is in electrical communication with the control module 42. The parking aid controller 30 is designed to input parking specific data to the scheduler 38, while the vehicle CAN 34 is configured to input data about the state of the vehicle 10 to the scheduler 38. The vehicle CAN 34 serves as a data communication bus for transmitting and sharing data. The parking aid controller 30 serves as the interface to raw sensor data and creates a localized coordinate system for parking maneuvers. The parking aid controller 30 is configured to provide a zone data signal Z(t), a distance to the target location signal $D_T(t)$, and a reference velocity $V_{ref}(t)$ at which the vehicle should be moving during the parking maneuver. The zone data signal Z(t) provides data from the proximity sensors 46 (FIG. 1) to alert the system 14 of the presence of the obstacle 66 proximate the vehicle 10, the target location 18 and/or the target path $T_P$. The vehicle relative target distance signal $D_T(t)$ gives the distance between the vehicle 10 and the final parking location (e.g., the target location 18 or the obstacle location 18A) at a given point in time. As explained above, the vehicle target distance signal $D_T(t)$ may be a static signal or a signal that changes with time as vehicle 10 moves along the target path $T_P$. The reference velocity $V_{ref}(t)$ is the velocity at which the vehicle 10 should be moving based on the commands from the parking aid controller 30. The reference velocity $V_{ref}(t)$ may change over time as the vehicle 10 moves through the parking maneuver. The vehicle CAN 34 may input a vehicle velocity signal v(t), a wheel count data signal $W_c(t)$, and a gear signal g(t) to the scheduler 38 indicating which gear the vehicle 10 is in. The wheel count data signal $W_c(t)$ may be determined from the wheel count encoder 26.

During operation, the scheduler 38 functions both as an estimator of the state of the vehicle 10 (e.g., moving forward or backwards) and a controller scheduler. While estimating the state of the vehicle 10, the scheduler 38 may perform four main tasks: wheel count to distance estimation, determination of a powertrain reference velocity, ultrasonic target detection, and determination of a distance error signal $e_d(t)$ and a velocity error signal $e_v(t)$. Both the distance error signal $e_d(t)$ and the velocity error signal $e_v(t)$ may be computed differently depending on the operation of the control module 42, or the detection of the obstacle 66 proximate the target path $T_P$ and/or target location 18. The distance error signal $e_d(t)$ and the velocity error signal $e_v(t)$ may be signals capable of use in feedback control configurations.

As explained above, the scheduler 38 may operate in a static target mode and a dynamic target mode based on the type of target distance signal $D_T(t)$ (e.g., static or dynamic) the parking controller 30 outputs. During the static target mode, the target distance signal $D_T(t)$ may be calculated by the scheduler 38 as follows:

$$D_T(t):=T-d_0(t) \quad (1)$$

where T represents the location of the target location 18 or obstacle 66 within a localized coordinate system of the system 14 and $d_0(t)$ is equal to a total linear distance traveled by the vehicle 10 since the start of the parking maneuver. During the static target mode of the scheduler 38, the total linear distance $d_0(t)$ traveled by the vehicle 10 along the target path $T_P$ since the beginning of the parking maneuver may be calculated and subtracted from the distance to the target location 18. The scheduler 38, while estimating the linear distance $d_0(t)$ of the vehicle 10, can be initialized at a time=0 (e.g., the start of the parking maneuver) or can be reinitialized at any point in time thereafter. In an exemplary embodiment, total linear distance $d_0(t)$ traveled by the vehicle 10 may be represented by the following function $$d_0(t) := \frac{R\pi}{63} W_C(t) \qquad (2)$$

where $d_0(t)$ is an estimate of the total linear distance traveled by the vehicle 10, R is a radius of the tires of the wheels 54 and $W_c(t)$ is the wheel count data signal supplied by the wheel count encoder 26. In the above exemplary function (2), the precision of the wheel count encoder 26 may be $$\frac{\pi}{63}$$

radians, according to one example. During the static target mode of the scheduler 38, the total linear distance $d_0(t)$ traveled by the vehicle 10 is compared to the target location T to calculate the distance error signal $e_d(t)$.

In various embodiments, the parking controller 30 may provide a dynamic target location signal $D_T(t)$ which is calculated by the parking controller 30 prior to being supplied to the scheduler 38. For example, calculation of the target distance signal $D_T(t)$ may be performed by the parking controller as follows:

$$D_T(t) := \|T - (x(t), y(t))\| \qquad (3)$$

where (x(t), y(t)) represents a point (e.g., hitch or axle) of the vehicle 10 which should be at the target location 18 when the parking maneuver is completed and T represents the location of the target location 18. In dynamic embodiments of the parking controller 30, the distance traveled $d_0(t)$ by the vehicle 10 may not be calculated and the target distance signal $D_T(t)$ may be converted directly to the distance error signal $e_d(t)$.

During operation of the parking maneuver by the vehicle 10, the proximity sensors 46 may alert the system 14 that the obstacle 66 is proximate the target path $T_P$ and/or the target location 18. The system 14 determines an obstacle distance $D_O(t)$ from the vehicle 10 in order to determine where in the coordinate system of the parking controller 30 the obstacle 66 is located. In some instances, the use of data from the proximity sensors 46 (e.g., the zone data signal Z(t)) may be erratic or biased due to proximity sensor 46 mis-calibration and/or environmental conditions. Accordingly, more data than just the zone data signal Z(t) may be used to calculate the location of the object. According to various embodiments, the obstacle distance $D_O(t)$ may be calculated differently depending on whether the scheduler is operating in the static target mode or the dynamic target mode. For example, the obstacle distance $D_O(t)$ may be calculated according to the following computer logic function $$D_O(t) := \begin{cases} d_0(t) + Z(t) & \text{in static target mode} \\ d_{t0}(t) + Z(t) & \text{in dynamic target mode} \\ \infty & \text{if } Z(t) = 0 \end{cases} \qquad (4)$$

where $d_0(t)$ represents the distance traveled by the vehicle 10 since the initiation of the parking maneuver, Z(t) is the zone signal data, $d_{t0}(t)$ is the distance traveled by the vehicle 10 since sensing of the obstacle 66. In some embodiments, the obstacle distance $D_O(t)$ is only updated once the zone data signal Z(t) is different from a previous time step. In such embodiments, the conservative estimate of the distance to the obstacle $D_O(t)$ may be used to ensure calibration issues with the proximity sensors 46 do not result in a collision. Use of the conservative estimate of the obstacle distance $D_O(t)$ may be formally expressed by the following:

$$D_O(t) := \min\{d_0(t), d_0(t-)\}. \qquad (5)$$

The scheduler 38 may smooth the quantized zone data of the zone data signal Z(t) using the wheel count data $W_c(t)$ to provide the control module 42 with a smooth distance error signal $e_d(t)$.

Referring again to FIGS. 2 and 3, arbitration of how the scheduler 38 should compute the distance error signal $e_d(t)$ may be important for a number of real life scenarios. For example, the scheduler 38 needs to be able to differentiate between instances where a shrub or light pole (e.g., the obstacle 66) is positioned behind a parking space (e.g., the target location 18) and instances where the obstacle 66 is actually in or proximate to the target path $T_P$. One solution as to how the scheduler 38 sets the appropriate distance error signal $e_d(t)$ is by taking the minimum distance calculated between the obstacle 66 and the target location 18. In an exemplary embodiment, arbitration by the scheduler 38 may be represented by the following computer logic function or equation $$e_d(t) := \qquad (6)$$
$$\begin{cases} \min\{D_0(t), \|T - (x(0), y(0))\|\} - d_0(t) & \text{in static target mode;} \\ \min\{(D_0(t) - d_{t0}(t)), D_T(t)\} & \text{in dynamic target mode.} \end{cases}$$

As can be seen by the computer logic function of equation (6), under the static target mode the distance traveled by the vehicle $d_0(t)$ is subtracted from the minimum of obstacle distance $D_O(t)$ and the distance between the starting location (x(o),y(0)) of the vehicle 10 subtracted from the target location T (e.g., 18). Under the dynamic target mode of the scheduler 38, the minimum of the distance traveled by the vehicle 10 since sensing of the obstacle 66 $d_{t0}(t)$ is subtracted from the obstacle distance $D_O(t)$. After arbitrating the distances between the obstacle 66 and the target location 18 to determine the shorter distance, the distance error signal $e_d(t)$ is based on the closer of the target location 18 and the obstacle 66. In situations where the obstacle 66 is closer, the vehicle 10 may be parked proximate the obstacle 66 at the obstacle location 18A to avoid collision with the obstacle 66.

The scheduler 38 also converts the reference velocity $V_{ref}(t)$ and the vehicle velocity v(t) into a velocity error signal $e_v(t)$. For example, the velocity error signal $e_v(t)$ may be calculated according to the following computer logic function $$e_v(t) := \begin{cases} V_{ref}(t) - v(t) & \text{if the module is in a speed limiting mode} \\ 0 - v(t) & \text{if else} \end{cases} \qquad (7)$$

As can be seen by function (7) the vehicle velocity v(t) is subtracted from the reference velocity $V_{ref}(t)$ when the control module 42 is in a speed limiting mode 70 or it may be calculated by subtracting the vehicle velocity v(t) from zero (0) when in other modes of the module central 42. The distance error signal $e_d(t)$ and the velocity error signal $e_v(t)$ are then input into the control module 42. When the scheduler 38 is functioning as a controller scheduler, the scheduler 38 outputs a mode switch signal q(t) which chooses which mode the control module 42 is operating in.

Figure 4A:
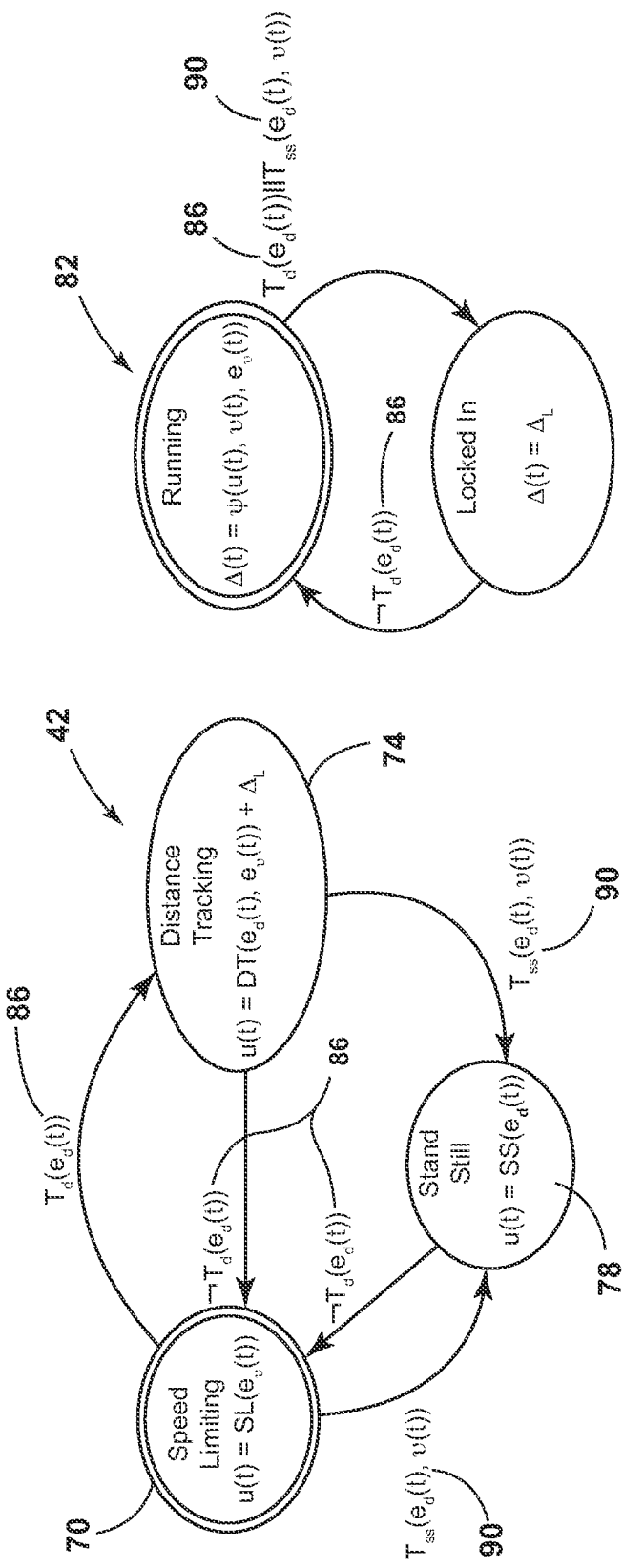
FIG. 4A is a schematic state diagram of the operation of a control module of the parking system, according to one embodiment.
Figure 4B:
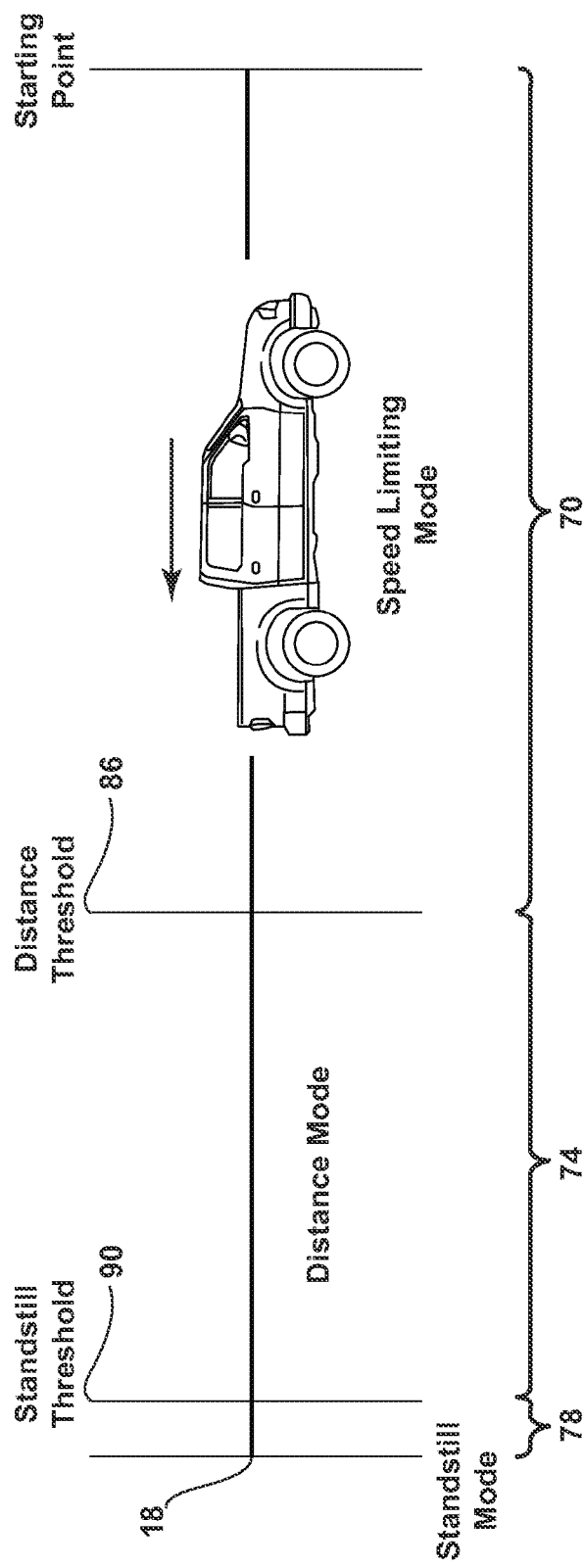
FIG. 4B is a pictorial representation of the operation of the control module of FIG. 4A, according to one embodiment.

Referring now to FIGS. 3-4B, the control module 42 may be operated in a plurality of modes which function based on the distance and velocity error signals $e_d(t)$, $e_v(t)$ and may be switched via mode switch signal q(t) issued from the scheduler 38. The control module 42 is capable of operating at least in the speed limiting mode 70, a distance tracking mode 74 and a stand still mode 78. Operating during use of the control module 42 is a disturbance estimator 82. The disturbance estimator 82 is used to compensate for disturbances experienced by the vehicle 10 during parking maneuvers. The control module 42, regardless of the mode it is in, is configured to output a deceleration request u(t) configured to slow the movement of the vehicle 10. The deceleration request u(t) may control the brake system 22 and/or the output of the powertrain (e.g., engine braking) of the vehicle 10 to brake the vehicle 10 and then affect a deceleration or slowing of the vehicle 10.

Referring now to FIGS. 4A and 4B, the control module 42 begins parking maneuvers in the speed limiting mode 70. In the speed limiting mode 70, the control module 42 operates through the use of proportional-integral (PI) control, and monitors the velocity error signal $e_v(t)$ output by the scheduler 38. The control module 42, in the speed limiting mode 70, initially works with the powertrain of the vehicle 10 to control the idle speed of the engine or motor of the vehicle 10 to reduce the vehicle velocity v(t) and thereby minimize the velocity error signal $e_v(t)$. If management of the output of the powertrain is not sufficient to lower the vehicle velocity v(t) (i.e., lower the velocity error signal $e_v(t)$ sent to the control module 42) to the reference velocity $V_{ref}(t)$ within a predetermined time frame, the control module 42 may actuate the brake system 22 to slow the vehicle 10. The brake system 22, in turn, applies braking force, which reduces the vehicle velocity v(t), thereby decreasing the velocity error signal $e_v(t)$. For the purposes of speed limiting mode 70 within a system, such as the parking assist system 14, the desired response is a system that quickly limits the vehicle velocity v(t) to the reference velocity $V_{ref}(t)$ with very little velocity overshoot. It is noted that minimizing velocity overshoot overall, as opposed to simply reducing velocity overshoot quickly, is desired, as the vehicle velocity v(t) is desirably maintained below the EPAS cutout speed, for example, at all times, but flexibility through increased speed availability may also be desired.

Working closely with the speed limiting mode 70 and the distance tracking mode 74 is the disturbance estimator 82. Upon activation of the speed limiting mode 70, the disturbance estimator 82 is initialized and begins running While the disturbance estimator is running it utilizes the deceleration request u(t) determined by the speed limiting mode 70, the vehicle velocity v(t), and the velocity error signal $e_v(t)$, to determine a brake torque Δ(t) required to keep the vehicle velocity v(t) at a steady state. The function psi ψ represents that once the speed limiting mode 70 brings the difference between the vehicle velocity v(t) and the reference velocity $V_{ref}(t)$ to a sufficiently small magnitude for a configurable amount of time, the brake torque Δ(t) of the speed limiting mode 70 is locked within the disturbance estimator 82 as a locked in brake torque $Δ_L$. Psi ψ may evaluate to a value of 0, or a previous value of the deceleration request u(t), prior to expiration of the configurable time, or may evaluate to the deceleration request u(t) once the configurable time has passed. In other words, the required amount of brake force required to keep the vehicle 10 from accelerating during a parking maneuver due to a disturbance is saved, or locked in, by the disturbance estimator 82 for later use with the distance tracking mode 74. Additionally, passing of the distance threshold 86, or the standstill threshold 90, may trigger the saving or storing of the locked in brake torque $Δ_L$ within the disturbance estimator 82. Exemplary disturbances to the parking of the vehicle 10 may include the target location 18 being located on the hill 62 or on a road with a non-negligible grade. The locked in brake torque $Δ_L$ is then output to the distance tracking mode 74 of the control module 42.

Once the vehicle 10 has crossed a distance threshold 86, the scheduler 38 sends the mode switch signal q(t) to the control module 42 to enter distance tracking mode 74. The distance threshold 86 may be a predetermined and/or configurable distance from the target location 18 as chosen by the driver, the manufacturer of the vehicle, the control module 42 or the scheduler 38. In an exemplary embodiment, the distance threshold 86 may be expressed as the following computer logic function $$T_d(e_d(t)) = \begin{cases} 1 & \text{if } e_{d(t)} \leq \delta_d \\ 0 & \text{else} \end{cases} \qquad (5)$$

where $e_d(t)$ is the distance error signal and $\delta_d$ represents the distance threshold 86. The distance threshold 86 may be less than about 5 meters, less than about 4 meters, less than about 3 meters, less than about 2 meters, or less than about 1 meter from the target location 18. The distance tracking mode 74 of the control module 42 is responsible for issuing the deceleration request u(t), which brings the vehicle 10 to a complete stop at the target location 18 using the brake system 22 and the locked-in brake torque $Δ_L$. The deceleration request u(t) may be based, at least in part, on the distance error signal $e_d(t)$, the velocity error signal $e_v(t)$, and the locked-in brake torque $Δ_L$. The distance tracking mode 74 may be configured to operate as a proportional-derivative (PD) control. In an exemplary embodiment, the distance tracking mode 74 may be in the form of the following equation $$u(t) = K_e e_v(t) + K_p e_d(t), \qquad (6)$$

wherein u(t) represents the deceleration request, $K_d$ represents a proportional gain (e.g., between about 0.2 and about 5), $K_p$ represents a derivative gain (e.g., between about 0.2 and about 5), $e_d(t)$ represents the distance error signal, and $e_v(t)$ represents the velocity error signal. The distance tracking mode 74 utilizes the distance and velocity error feedback signals $e_d(t)$, $e_v(t)$ until the distance error feedback signal $e_d(t)$ reaches a value of 0. In the distance tracking mode 74, the velocity error $e_v(t)$ is calculated as the negative of the vehicle velocity v(t). The change in how the velocity error $e_v(t)$ is calculated is done such that the vehicle 10 will ultimately come to a stop, and not maintain the reference velocity $V_{ref}(t)$. As the distance tracking mode 74 utilizes the locked-in brake torque $Δ_L$ stored by the disturbance estimator 82, the distance tracking mode 74 has nearly perfect distance tracking leading to little or no overshoot of the target location 18.

The standstill mode 78 is designed to prevent the vehicle 10 from overshooting the target location 18, or prevent contact with an object or obstacle proximate the vehicle 10. The scheduler 38 switches the control module 42 to standstill mode 78 when the scheduler 38 detects the vehicle 10 is likely to pass through a standstill threshold 90, such that overshoot of the target location 18 is likely to occur, or contact with an object or obstacle proximate the vehicle 10 is imminent (e.g., via the zone data signal Z(t)). In the standstill mode 78, the control module 42 instructs the brake system 22 to increase braking force in an inversely proportional relationship to the distance error signal $e_d(t)$. In a specific embodiment, the standstill mode 78 may be a static function such as the following:

$$u(t) = \frac{g_{ss}}{\max\{e_d(t), o_{ss}\}}, \quad (7)$$

wherein u(t) is the deceleration request, $g_{ss}$ is a stand still gain (e.g., between about 0.1 and about 5), and the maximum values of the distance error signal $e_d(t)$ and a stand still offset $o_{ss}$ (e.g., between about 0.05 and about 0.5) are taken. The stand still gain $g_{ss}$ value of function (3) allows for changes to the intensity and maximum values of deceleration request u(t) output by the stand still mode 78.

As explained above, the scheduler 38 is responsible for switching the control module 42 between the modes 70, 74, 78. The control module 42 is initialized in the speed limiting mode 70, and adjusts the speed of the vehicle 10 to approximately that of the reference velocity $V_{ref}(t)$. The control module 42 switches modes to the distance tracking mode 74 from the speed limiting mode 70 when the vehicle 10 passes the distance threshold 86, as represented by $T_d(e_d(t))$. The transition from the distance tracking mode 74 to the stand still mode 78 is initiated at the standstill threshold 90. The standstill threshold 90 may be a threshold of a predetermined function of the distance error $e_d(t)$ and the vehicle velocity v(t) which indicates to the scheduler 38 and/or the control module 42 that the vehicle 10 is sufficiently close to the target location 18, that overshoot of the target location 18 is likely or imminent or that contact with an object or obstacle is imminent. This is illustrated as $T_{ss}(e_d(t), v(t))$ to indicate that the standstill threshold 90 is a function of the distance error $e_d(t)$ and the vehicle velocity v(t). Additionally or alternatively, the standstill threshold 90 may be a predefined distance from the target location 18. In an exemplary embodiment, the standstill threshold 90 may be represented by the following computer logic function:

$$T_{ss}(e_d(t), v(t)) = \begin{cases} 1 & \text{if } v(t) \geq (\delta_s e_d(t) + \delta_0) \\ 0 & \text{else} \end{cases} \quad (8)$$

where v(t) represents the vehicle velocity, $\delta_s$ represents a slope in a position versus velocity space (e.g., between about 0.1 and about 10), $\delta_o$ represents an offset in a position versus velocity space, and $e_d(t)$ represents the distance error signal. The interpretation of function (4) is that the slope $\delta_s$ and offset $\delta_o$ define a line in a position versus velocity space, and if the current distance error $e_d(t)$ and vehicle velocity v(t) are above this line, then an overshoot of the target location 18 is likely and the control module 42 will transition to standstill mode 78.

It will be understood by one having ordinary skill in the art that construction of the described invention and other components is not limited to any specific material. Other exemplary embodiments of the invention disclosed herein may be formed from a wide variety of materials, unless described otherwise herein.

As explained above, embodiments of the scheduler 38 that may operate on both static and dynamic target signals may be advantageous in that it offers designers of the system 14 flexibility in choice of the parking controller 30, as well as overall system 14 design. This flexibility in choice of parking controller 30 may allow a cost savings to be had by being able to choose a less expensive parking controller 30, or a cost savings to be realized because less design time needs to be spent on the system 14.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature, unless otherwise stated.

It is also important to note that the construction and arrangement of the elements of the invention, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims, by their language, expressly state otherwise.

What is claimed is:

1. A parking assist system for a vehicle, comprising:
   a parking controller configured to output a static or dynamic distance to target signal, wherein the static or dynamic distance to target signal is based on the position of the vehicle relative to a target parking location;
   a scheduler configured to accept the distance to target signal and output a distance error signal based on either the static signal and a linear distance traveled by the vehicle or the dynamic signal, wherein the distance error signal is based on the distance between the vehicle and the target parking location; and a control module configured to longitudinally control parking of the vehicle based on the error signal and operated in a first mode in a proportional-integral control and is configured to determine a brake torque based on a difference between a vehicle velocity and a reference velocity, a second mode in a proportional-derivative control based on the distance error signal and a third mode which increases brake torque inversely proportional to the distance error signal.

2. The parking assist system of claim 1, further comprising:

a proximity sensor configured to sense a distance to an obstacle, wherein the scheduler is configured to determine a location of the obstacle differently when receiving the static distance to target signal than when receiving the dynamic distance to target signal.

3. The parking assist system of claim 2, wherein the scheduler is configured to calculate the location of the obstacle based at least in part on a distance traveled by the vehicle and data from the proximity sensor.

4. The parking assist system of claim 1, wherein the scheduler is configured to calculate the distance error signal as equal to the dynamic distance to target signal when receiving the dynamic distance to target signal.

5. A method for assisting in parking a vehicle, comprising the steps of:

initiating a parking sequence to a target location;

transmitting a static or dynamic distance to target signal from a parking controller to a scheduler, wherein the static or dynamic distance to target signal is based on the position of the vehicle relative to a target parking location;

generating a distance error signal using the scheduler based on either the static signal and a linear distance traveled by the vehicle or the dynamic signal, wherein the distance error signal is based on the distance between the vehicle and the target parking location; and moving the vehicle based on the distance error signal, wherein a control module is operated in a first mode in a proportional-integral control and is configured to determine a brake torque based on a difference between a vehicle velocity and a reference velocity, a second mode in a proportional-derivative control based on the distance error signal and a third mode which increases brake torque inversely proportional to the distance error signal.

6. The method of claim 5, wherein the scheduler is configured to convert a wheel count signal into the linear distance traveled by the vehicle.

7. The method of claim 5, wherein the distance error signal is a feedback signal.

8. The method of claim 5, further comprising the step of:

generating a velocity error signal based on a vehicle velocity and a reference velocity signal using the scheduler, wherein the distance error signal and the velocity error signal are both transmitted to the control module.

9. The method of claim 8, further comprising:

an ultrasonic sensor.

10. The method of claim 9, wherein the control module is configured to control the longitudinal motion of the vehicle based on the distance error signal and the velocity error signal.

11. A method for assisting in parking a vehicle, comprising the steps of:

initiating a parking sequence to a target location;

receiving a dynamic distance to target signal at a scheduler based on a distance between the vehicle and the target location;

sensing the presence of an obstacle with a proximity sensor and a distance between the vehicle and the obstacle, wherein the distance error signal is based on the distance between the vehicle and one of a target parking location and the obstacle;

determining a distance traveled by the vehicle since sensing of the obstacle;

generating a distance error signal based on the closer of the target location and obstacle; and parking the vehicle proximate one of the target location and obstacle based on the distance error signal using a control module which is operated in a first mode in a proportional-integral control and is configured to determine a brake torque based on a difference between a vehicle velocity and a reference velocity, a second mode in a proportional-derivative control based on the distance error signal and a third mode which increases brake torque inversely proportional to the distance error signal.

12. The method of claim 11, wherein the scheduler is configured to convert a wheel count signal into the distance traveled by the vehicle.

13. The method of claim 11, wherein the distance error signal is a feedback signal.

14. The method of claim 13, further comprising the step of:

generating a velocity error signal based on a vehicle velocity and a reference velocity signal using the scheduler, wherein the distance error signal and the velocity error signal are both transmitted to the control module.

15. The method of claim 14, wherein the control module is configured to control the longitudinal motion of the vehicle based on the distance error signal and the velocity error signal.

* * * * *